Figure 1:
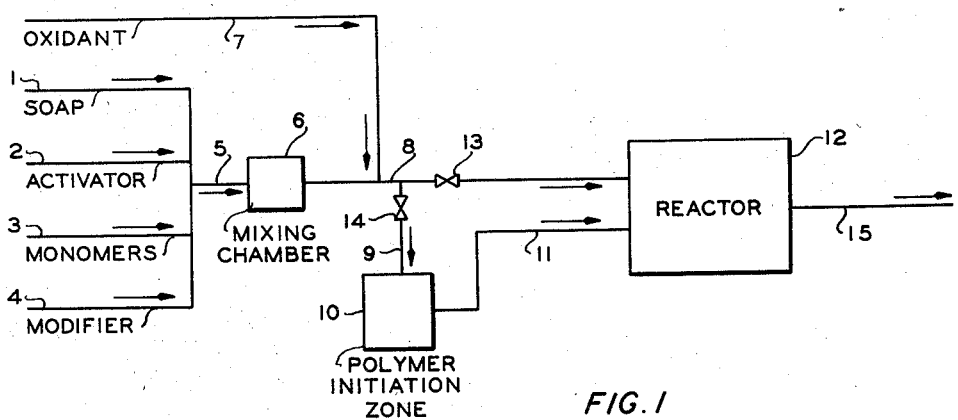

United States Patent Office 2,872,438
Patented Feb. 3, 1959

2,872,438

CONTINUOUS POLYMERIZATION PROCESS FOR PRODUCTION OF HIGH-SOLIDS LATEX

James H. Carroll, Phillips, and Robert S. Hanmer, Borger, Tex., assignors to Phillips Petroleum Company, a corporation of Delaware Application August 10, 1953, Serial No. 373,234

16 Claims. (Cl. 260—83.7)

This invention relates to a continuous emulsion polymerization process for the production of high-solids latex. This invention more specifically relates to a continuous emulsion polymerization process for the production of high-solids latex in which said process comprises the use of a polymer initiation zone ahead of the main reactor where in said polymer initiation zone a low degree of polymerization is effected to produce polymer particle nuclei which are then introduced into the reactor where the bulk of the polymerization takes place in the presence of polymer particles already formed.

The polymerization of monomeric material in aqueous emulsion is well known in the art. In effecting such emulsion polymerization of a monomeric material, particularly when a batch-type or semi-batch type operation is carried out, the reactor is usually first charged with the aqueous medium, which contains the desired emulsifying agent, and the monomeric material is then added while agitating the contents. At the same time a reaction modifier, such as a mercaptan, is also included, usually in solution in at least a part of the monomeric material. An activator solution and an oxidant are separately added to the reaction mixture, and then the polymerization proceeds. The activator solution may be, and usually is, incorporated in the aqueous medium prior to the addition of the monomeric material, and then the oxidant is added as the last ingredient. Sometimes, however, satisfactory polymerization results can be obtained when the oxidant is incorporated prior to addition of the activator which is added as the last ingredient. It is also sometimes the practice to add portions of one or the other of the activator solution and oxidant intermittently, or continuously, during the course of the reaction. If the operation is carried out continuously, streams of the various ingredients are admixed in somewhat the same order as they were in the herein above described batch process prior to their final introduction into the polymerization reaction zone. The admixture thus produced will be known for the purpose of this specification and the appended claims as the recipe stream or the latex forming stream.

In recent years, much attention has been devoted to the development of continuous polymerization processes. These processes usually are carried out in a long tube like apparatus, a large vessel with continuous draw off and recirculation of the unpolymerized material, or a series of reaction vessels.

We have discovered that a high-solids latex can be produced from a monomer emulsion wherein the emulsifying agent is a micelle forming material by providing a polymer initiation zone or polymer generation zone ahead of the main reactor where in said zone a low degree of polymerization is effected to produce polymer particle nuclei. A portion or all of the monomer emulsion can be passed through the polymer initiation zone prior to introduction into the reactor where the bulk of the polymerization takes place in the presence of polymer particles already formed.

We will describe our invention using soap as the micelle forming emulsifying agent since the sodium and potassium salts of the fatty acids are the most commonly used emulsifying agents. However, any emulsifying agent capable of forming micelles is applicable in our invention. Such agents are well known in the art and we have named some such agents herein below.

In the early stages of emulsion polymerization, the chief locus of reaction is in the soap micelles which have been swollen by the monomers. Soap micelles are formed in an aqueous soap solution where the hydrophobic hydrocarbon groups of the soap compound tend to cluster together. When monomers are present they enter the soap micelles and cause them to swell, and at the same time, these monomers begin to polymerize within the micelles. As polymerization proceeds the formation of many small polymer particles occurs. As the polymer particles grow, soap is adsorbed on the surface of these polymer particles reducing the concentration of the free soap. As the concentration of free soap is reduced, the micelles disappear and, during the later stages of polymerization, the chief locus of reaction is on the polymer particles. In the polymer initiation zone of this invention, the formation of polymer particles is initiated in the swollen soap micelles and, while still in the micellar stage, the material is transferred to the reaction zone wherein the polymer concentration in the latex remains substantially uniform.

Figure 2:
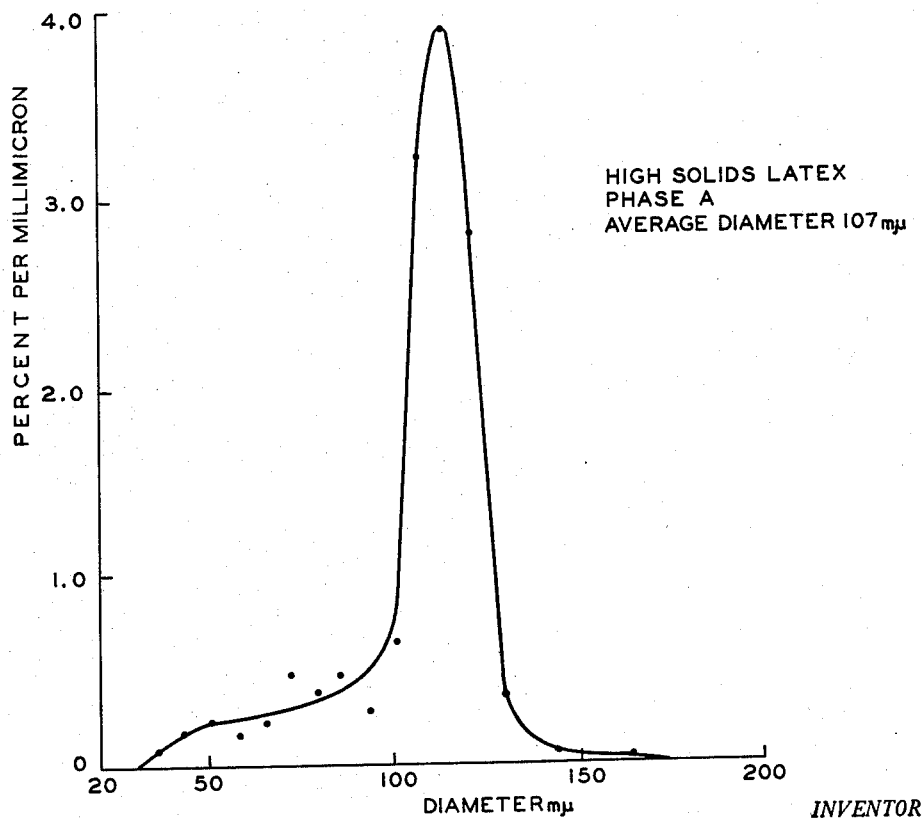
Figure 3:
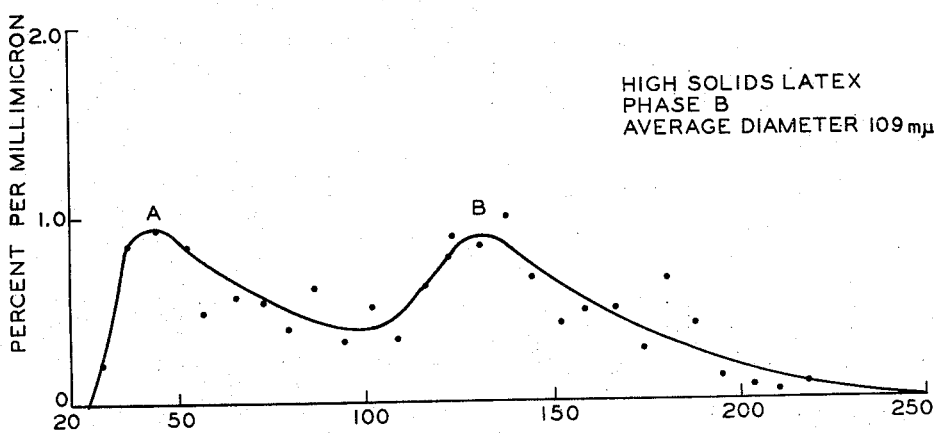
Figure 4:
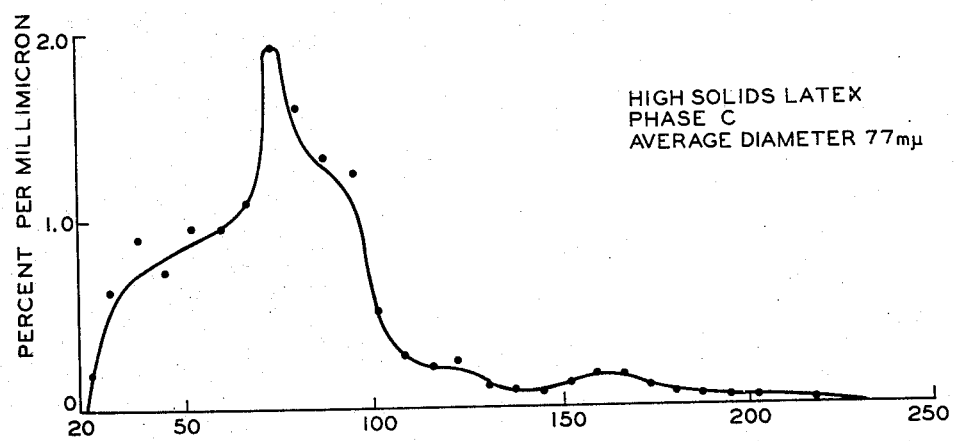
Figure 5:
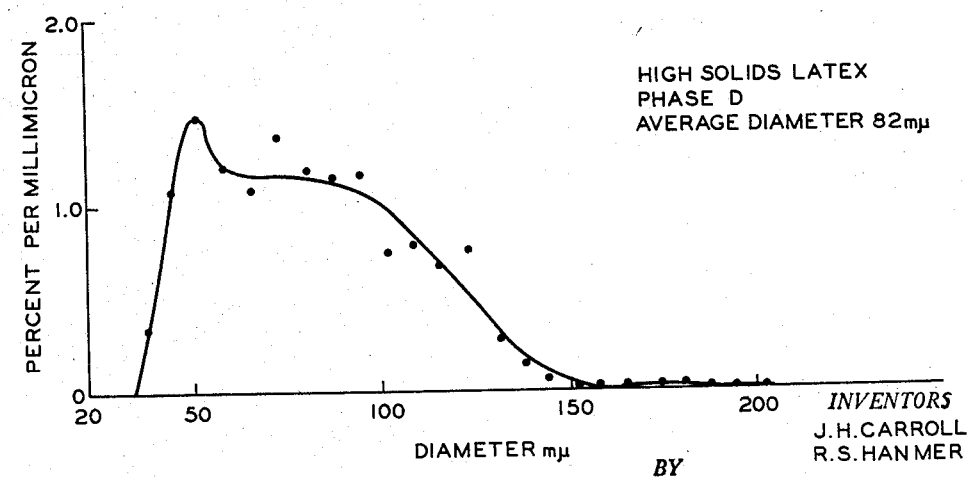
Figure 6:
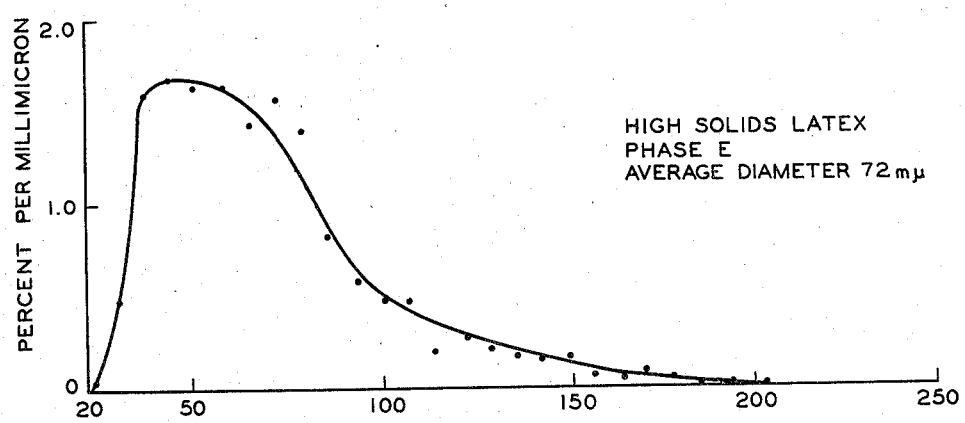
Figure 7:
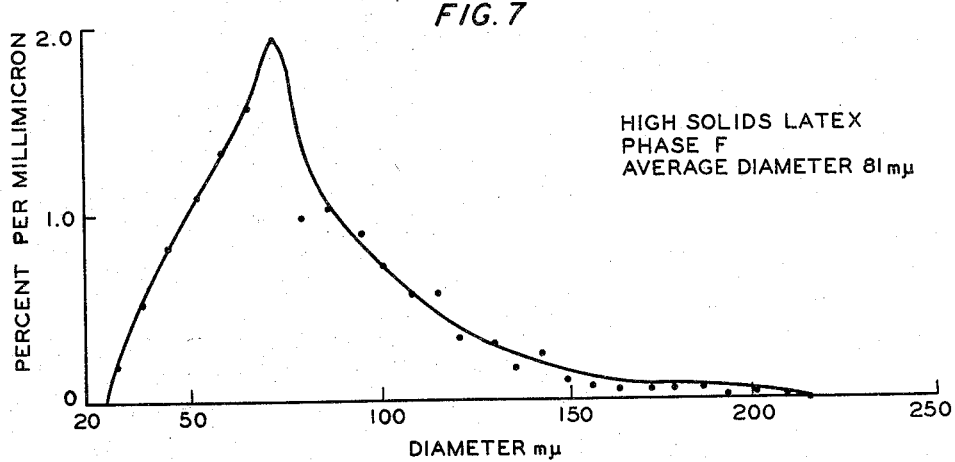

Figure 1 is a flow diagram illustrating the flow of materials through the polymer initiation zone and the reactor, Figure 2 is a particle size distribution curve made on a latex produced by polymerization of butadiene and styrene without the use of a polymer initiation zone, Figure 3 is a particle size distribution curve made on a latex produced by polymerization of butadiene and styrene with the use of polymer initiation zone and shows the particle size distribution during the transition period, Figure 4 is a particle size distribution curve made on a latex produced by polymerization of butadiene and styrene with the use of a polymerization initiation zone at an average reactor temperature somewhat higher than it was when the latex of Figure 3 was produced, Figure 5 is a particle size distribution curve made on a latex produced by polymerization of butadiene and styrene with the use of a polymerization initiation zone at an average reactor temperature substantially the same as it was during the production of the latex of Figure 3, Figure 6 is a particle size distribution curve made on a latex produced by the polymerization of styrene and a latex produced by the polymerization of styrene and butadiene and where the butadiene-styrene ratio was different than it was in the production of the latex of Figure 3. This curve shows the transition period, and Figure 7 is a particle size distribution curve made on a latex produced by the polymerization of styrene and butadiene where the butadiene-styrene ratio is the same as was the ratio in the production of the latex of Figure 6 but where the production system has leveled out.

The process of this invention can be described by reference to the attached schematic drawing Figure 1. In one embodiment, the soap solution, activator, monomers, and modifier are introduced continuously via lines 1, 2, 3 and 4 into a common feed line 5 which leads to a mixing chamber 6 where an emulsion is formed. The oxidant or polymerization initiator is introduced continuously from line 7 into line 8, which contains the emulsion of soap, activator, monomers, and modifier from mixing chamber 6. A portion or all of the stream from line 8 is diverted through line 9 to polymer initiation zone 10 and thence through line 11 to reactor 12 where the bulk of the polymerization takes place in the presence of polymer particles already formed therein. Valves 13 and 14 are provided for directing the charge stream in the manner desired. The effluent from the reactor is removed continuously through line 15, shortstop and antioxidant are added, and the recovery operations are effected. Provision can be made, if desired, for recycle of unreacted monomers to the system.

The invention provides for the passage of a portion or all of the total polymerization ingredients through a polymer initiation zone prior to their entrance into the reactor wherein the bulk of the polymerization takes place in the presence of polymer already formed and wherein the polymer concentration in the latex remains substantially uniform. The procedure hereinbefore described represents only one embodiment of the invention. Various modifications can be introduced so long as a polymer initiation zone is employed in the manner described. For example, in some instances the soap and activator solutions are mixed first and charged continuously to the mixing chamber simultaneously with the monomers containing the modifier instead of introducing the material in four separate streams as shown in the drawing. In another embodiment the process can be operated with a number of reactors connected in parallel with a stream from the polymer initiation zone directed to each reactor, that is one polymer initiation zone can supply polymer nuclei to two or more reactors.

The reactor used in our invention is a single vessel wherein the greatest dimension (length, width, diameter, height, etc.) generally does not exceed any other dimension in magnitude by more than 5 times. That is, the cross sectional area is large compared to the height or length as contrasted to a long pipe or tubing. It is understood that said vessel will include suitable cooling means, agitating means, be of suitable construction to withstand the required pressures and be non-corrosive in contact with the reactants and reactant products.

The polymer initiation zone is provided with a means for agitation of the reactants and also a means for temperature control as is the reaction zone.

In the polymer initiation zone a low degree of polymerization in a given catalyst system and recipe is effected by control of the residence time and temperature of the polymer initiation zone with the conversion generally being in the range between 1 and 12 percent, preferably in the range between 3 and 10 percent. Residence time in the polymer initiation zone depends upon the polymerization recipe and the temperature. As already stated, a portion or all of the polymerization charge stream can be passed through this zone.

Any type of polymerization recipe can be employed for the production of high solids latices according to the process of this invention. Polymerization temperatures are generally in the range between −40 and +160° F. It is not required that the temperature in the polymer initiation zone be the same as that in the reaction zone. For example, it is sometimes preferred to operate the polymer initiation zone at room temperature or higher and maintain the temperature in the reaction zone at a lower level, for example 50° F. or lower.

It is generally preferred that the residence time in the reactor be such that a conversion of at least 70 percent is attained and preferably 75 percent or more. Where operating in this manner, the ratio of aqueous phase to monomer should be so controlled that the reactor solids content should be at least 30 percent by weight and preferably 35 to 40 percent by weight or higher.

When operating with the use of a polymer initiation zone as set forth in this invention, there is a wide range in particle size of latex produced, say from 20 to 220 millimicron or higher. However, the bulk of the material will be between .25 and 100 millimicron in diameter. After steady state is reached, the average composition and concentration within the reactor remains substantially constant. When operating according to our process, a higher conversion rate is obtained, for a given residence time, polymerization temperature, etc. than can ordinarily be reached when all of the ingredients are charged directly to the reactor.

The monomeric material to be polymerized by the process of this invention comprises unsaturated organic compounds which generally contain the characteristic structure $CH_2=C<$ and, in most cases, have at least one of the disconnected valence bonds attached to an electronegative group, that is, a group which increases the polar character of the molecule such as a chlorine group or an organic group containing a double or triple bond such as vinyl, phenyl, cyano, carboxy or the like. Included in this chain of monomers are the conjugated dienes such as butadiene (1,3-butadiene), 2,3-dimethyl-1,3-butadiene, isoprene, piperylene, 2-furyl-1,3-butadiene, 2-methoxy-1,3-butadiene and the like; haloprenes, such as chloroprene (2-chloro-1,3-butadiene), bromoprene, methylchloroprene (2-chloro-3-methyl-1,3-butadiene), and the like), aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methylacrylamide and the like; methyl isopropenyl ketone, methyl vinyl ketone, methyl vinyl ether, vinylethynyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diene with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber, although, as can be readily deduced from the foregoing, there is a host of possible reactants, the most readily and commercially available monomers at present are butadiene itself (1,3-butadiene) and styrene. With these specific monomers, it is usually preferred to use them together, in relative ratios of butadiene to styrene between 20:80 and 95:5 parts by weight.

When this polymerization process is to be carried out at low temperatures, it is desirable to include water-soluble antifreeze components in the aqueous phase in order to depress the freezing point to a point below the temperature of the polymerization reaction. Inorganic salts and alcohols can be so used. Examples of suitable salts are those of ammonia, and alkali and alkaline earth metals, including chlorides, nitrates, sulfates etc. Alcohols which are applicable comprise water-soluble compounds of both monohydric and polyhydric types, including methanol, ethylene glycol, glycerol and erythritol, by the way of example.

Emulsifying agents which are applicable in this polymerization process are those agents which form micelles in aqueous media. Many such emulsifying agents are found in the art. Among the emulsifying agents which form micelles and are therefore applicable in the process of our invention are the alkali metal and ammonium salts of fatty acids such as sodium oleate, sodium stearate, so- -dium laurate, sodium myristate, sodium palmitate, the corresponding potassium salts and the like ammonium salts; the ammonium and alkali metal salts of rosin acids such as the ammonium, sodium and potassium salts of abietic acid, dehydroabietic acid, dihydroabietic acid and tetrahydroabietic acid; and such other materials as the alkyl and alkaryl sulfonates and the like. The controlling factor is that the emulsifying agent must form micelles. For example, a low molecular weight fatty acid salt which may not be micelle-forming in pure water, will be micelle-forming and thus suitable for use in a system containing a relatively large quantity of an inorganic salt (this is exemplified by the so called "salt-antifreeze recipe" well known in the art).

As has hereinbefore been stated, emulsifying agents capable of forming micelles are well known and the use of such agents is well known in the art. As in any application of emulsifying agents, the emulsifying agents to be used in this invention should not be an inhibitor of polymerization nor should it have any other deleterious effects either on the process or on the product.

We prefer the ammonium and alkali metal salts of fatty acids either alone or in admixture with alkali metal salts of rosin acids as our emulsifying agents. Such agents readily form micelles and provide ideal loci for polymer initiation.

When carrying out the polymerization reactions by the process of this invention, it is frequently considered desirable to include an electrolyte in the system, such as potassium chloride, trisodium phosphate, or other such salts which do not produce deleterious effects. One function of an electrolyte is to increase the fluidity of the latex. Generally the amount of such salt will not exceed one part by weight per 100 parts of monomers.

Examples of polymerization recipes to which the methods of our invention is applicable comprise the redox-type, comprising hydroperoxides or peroxides with heavy metal salts, peroxamine-type, comprising peroxide materials with polyamines, diazothioether recipes and persulfate-type recipes.

The oxidizing components used in these recipes are preferably tri-substituted hydroperoxymethanes, also referred to as hydroperoxides. These compounds are represented by the formula

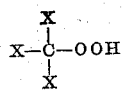

wherein each X, individually, is one of the group comprised of aliphatic, cycloaliphatic, aromatic, olefinic, and cycloolefinic radicals. Each of these radicals can be completely hydrocarbon in character, and can be of mixed characters such as aralkyl, alkaryl, and the like, and can also have non-hydrocarbon substituents; particularly useful non-hydrocarbon substituents include oxygen in the form of hydroxy and ether compounds, sulfur in similar compounds (i. e. mercapto compounds and thioethers), and halogen compounds. Such hydroperoxides can be easily prepared by simple oxidation, with free oxygen, of the corresponding hydrocarbon or hydrocarbon derivative, i. e., of the parent tri-substituted methane. If desired, the hydroperoxides can be used in the form of their alkali metal salts. Examples of suitable hydroperoxides which can be used are: dialkyl aryl, dialkyl alkaryl, trialkyl, tri-alkenyl hydroperoxymethanes; hydroperoxides of octahydrophenanthrene and its derivatives, hydroperoxides of alkyl tetralins and their derivatives; and aryl cyclohexyl hydroperoxides. In addition to or instead of hydroperoxides, organic peroxides can be used as the oxidant material, benzoyl peroxide being perhaps the most widely used of the many organic peroxides known. In general, when the material acting as an oxidant in the recipe is a peroxidic-type material, it can be generally described by the formula R'OOR'' where R' and R'' are each one of the group hydrogen, alkyl, aryl, acyl, aralkyl, and cycloalkyl; the named hydrocarbon radicals can also contain olefinic bonds in an aliphatic chain and/or be substituted by non-hydrocarbon groups.

In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like.

One commonly used oxidation catalyst is an iron pyrophosphate. When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish green precipitate at sufficiently high concentration of ingredients. When preparing the activator the mixture is generally heated above 120° F., for variable periods depending upon the temperature. For example, if the material is boiled, a period of twenty minutes or less is sufficient to produce the desired activity, and the time of boiling may then be as low as 30 seconds. One convenient method of operation involves maintaining the temperature of the activator solution at about 140° F. for a period of heating ranging from 10 to 30 minutes. Prior to heating the activator mixture, the vessel is usually flushed with an inert gas such as nitrogen. In general it is preferred to heat the mixture below the boiling point, say at a temperature around 130° to 170° F.

As previously stated, it is usually desirable that the multivalent metal be present in its lower valence state. With some recipes, it is unnecessary to include an organic reducing agent either in the activator solution or in the polymerization mixture. However, particularly at temperatures above 32° F., a faster reaction is sometimes obtained with some receipes when a small amount of an organic reducing agent, such as a reducing sugar, is included in the polymerization receipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

In carrying out polymerization reactions, it is desirable to use a polymerization modifying agent. Preferred polymerization modifiers are alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. In the case of tertiary mercaptans, such as tertiary $C_{12}$ mercaptans, blends of tertiary $C_{12}$, $C_{14}$ and $C_{16}$ mercaptan, and the like, satisfactory modification is obtained with 0.05 to 3.0 parts mercaptan per 100 parts monomer, but smaller or larger amounts can be employed.

Advantages of this invention are illustrated by the following examples. The reactants, and their proportions, and the other specific ingredients of the recipes are presented as being typical and should not be construed to limit the invention.

*Example I*

A continuous run was made for the preparation of high-solids latex over an operating period of 837 hours. The run was made in six different phases designated A through F. The temperature was maintained in the range between 41 to 55° F. except for occasional brief intervals when it increased somewhat above 55° F. During the first part of the run the ingredients were charged directly to the reactor. In a residence time of 30 hours, steady-state conditions were reached with the production of a latex having a solids content of about 27 percent at a conversion of 40 percent. The duration of the first phase of the run was 112.5 hours. During this time the butadiene/styrene ratio was 70/30 parts by weight. The amount of water averaged 75.7 parts by weight and the soap 3.03 parts by weight per 100 parts monomers. The recipes for the next two phases of the run, designated B and C, were as follows (quantities of the materials represent the average for the particular phase of the run):

|  | Parts by Weight | |
|---|---|---|
|  | B | C |
| Water | 76.6 | 80 |
| Butadiene | 70 | 70 |
| Styrene | 30 | 30 |
| Potassium oleate | 4.09 | 4.21 |
| K Cl | 0.72 | 0.74 |
| Daxad 11 [1] | 1.02 | 1.05 |
| Mercaptan blend [2] | 0.17 | 0.21 |
| K₄P₂O₇ | 0.373 | 0.384 |
| FeSO₄·7H₂O | 0.286 | 0.295 |
| Diisopropylbenzene hydroperoxide | 0.195 | 0.195 |

[1] Sodium salt of condensed alkyl aryl sulfonic acid.
[2] A blend of tertiary $C_{12}$, $C_{14}$ and $C_{16}$ aliphatic mercaptans in a ratio of 3:1:1 parts by weight.

The charging procedure that was used during the first phase of the run was followed for the first part of the second phase. The procedure was then changed and the materials passed through a polymer initiation zone prior to being introduced into the reactor. The polymer initiation zone was at room temperature and the residence time was six to twelve minutes. The main reactor was operated under the same conditions as it was in the first phase of the run, except that the residence time in the reactor was raised to 60 hours. As will be shown hereinafter, the doubling of the residence time while holding the other conditions substantially the same, had no effect on the solids content of the latex or on the percent conversion in the reactor. In order to show the effect of the polymer initiation zone, data for a portion of B starting just prior to the beginning of the use of the polymer initiation zone and all of C are shown below:

| Time, Hours [1] from Start | Monomer [2] Ratio | Water [2] Parts | Soap [2] Parts | Residence [2] Time, Hrs. | Percent Conversion [2] | | |
|---|---|---|---|---|---|---|---|
|  |  |  |  |  | Solids [2] Contents, Percent | Polymer Initiation Zone | Reactor |
| B { 168.3 | 70/30 | 75.6 | 4.04 | 58 | 35 | --- | 57 |
| 176.3 | 70/30 | 77.8 | 4.15 | 59 | 35 | --- | 57 |
| 184.3 | 70/30 | 75.8 | 4.04 | 59 | 36 | --- | 59 |
| 189.4 | 70/30 | 74.3 | 3.97 | 59 | 36 | --- | 59 |
| [3] 194.5 | 70/30 | 81.1 | 4.33 | 67 | 36 | --- | 59 |
| 202.5 | 70/30 | 75.0 | 4.00 | 61 | 36 | --- | 59 |
| 210.5 | 70/30 | 74.6 | 3.98 | 64 | 38 | --- | 63 |
| [4] 212.5 | 70/30 | 84.4 | 4.50 | 60 | 39 | --- | 65 |
| C { 6 | 70/30 | 77.0 | 4.11 | 65 | 40 | 2 | 68 |
| 14 | 70/30 | 79.5 | 4.24 | 60 | 42 | 10 | 72 |
| 22 | 70/30 | 76.2 | 4.07 | 60 | 45 | 4 | 77 |
| 30 | 70/30 | 70.2 | 3.74 | 60 | 46 | 7 | 80 |
| 36 | 70/30 | 80.0 | 4.27 | 60 | 48 | 5 | 82 |
| 38 | 70/30 | 73.2 | 3.91 | 61 | 48 | 4 | 82 |
| 46 | 70/30 | 76.3 | 4.07 | 59 | 48 | 3 | 82 |
| 54 | 70/30 | 75.0 | 4.00 | 60 | 48 | 3 | 82 |
| 62 | 70/30 | 76.7 | 4.09 | 60 | 48 | 7 | 82 |
| 70 | 70/30 | 89.8 | 4.79 | 66 | 48 | 5 | 82 |
| [5] 77 | 70/30 | 80.8 | 4.27 | 62 | 48 | 6 | 82 |

[1] Time is counted from the beginning of the particular phase of the run designated as B or C.
[2] Average values for the time intervals indicated.
[3] Beginning of passage of materials through polymer initiation zone.
[4] End of second phase of the run (B).
[5] End of third phase of the run (C).

These data show that after the materials were passed through the polymer nuclei generation zone, the solids content and percent conversion both increased while the residence time in the reactor remained substantially the same.

The average data for all six phases of the run are summarized in the following table:

| Phase | Total Hrs. | Monomer Ratio | Parts by Wt. | | Reactor Residence Time, Hr. | Temp. Reactor, °F. | Percent Solids Latex | Percent Conversion | |
|---|---|---|---|---|---|---|---|---|---|
|  |  |  | Water | Soap |  |  |  | Initiation Zone | Reactor |
| A | 112.5 | 70/30 | 75.7 | 3.03 | 31.1 | 41 | 27 | --- | 40 |
| B-1 | 100.0 | 70/30 | 73.4 | 2.97 | 63.1 | 41 | 26 | --- | 41 |
| B-2 | 94.5 | 70/30 | 74.8 | 3.98 | 61.0 | 55 | 35 | --- | 57 |
| B-3* | 18.0 | 70/30 | 76.6 | 4.09 | 61.0 | 50 | 38 | --- | 63 |
| C | 77.0 | 70/30 | 80.0 | 4.21 | 61.0 | 50 | 48 | 5 | 82 |
| D | 130.5 | 70/30 | 54.8 | 3.98 | 61.0 | 60 | 49 | --- | 73 |
| E-1 | 102.5 | 70/30 | 66.1 | 4.06 | 61.0 | 50 | 45 | --- | 74 |
| E-2 | 43.3 | 85/15 | 65.7 | 4.08 | 60.1 | 50 | 49 | --- | 78 |
| F | 158.7 | 85/15 | 67.4 | 4.10 | 60.0 | 50 | 54 | --- | 87 |
| Total Hrs. | 837 |  |  |  |  |  |  |  |  |

*Started use of polymer initiation zone.

These data, from above table, show that the polymer initiation zone has a major effect upon the solids content of the latex and the percent conversion in the reactor. When the residence time in the reactor was doubled as from phase A to B-1, there was no appreciable effect on these properties. At the beginning of B-2 part of the run, there was a power failure for 3 hours and the temperature rose to 64° F. When power was restored, the temperature was controlled at 50° F. At about this same time, the soap parts was raised from 3 to 4. The combination of these two changes, higher temperature and higher soap, improved the solids content and the conversion rate as was expected. When the data taken on the material made during the C phase of the run is compared with the B-2 phase data, the significance of the polymer initiation zone is immediately apparent. While all conditions are kept substantially the same, a residence time of six to twelve minutes in the polymer initiation zone has resulted in an increase from 35 to 48 percent solids in the latex and an increase from 57 to 82 percent conversion in the reactor.

The effect of the polymer initiation zone on the particle size and particle size distribution is shown hereinafter.

The particle size of the latex in each of the six phases of the above-described run was determined by electron microscope examination. The following results were contained:

| Latex | Average Diameter, Millimicrons |
| --- | --- |
| A—vented | 106.6 |
| B—vented | 108.8 |
| C—stripped | 77.2 |
| D—vented | 81.6 |
| E—stripped | 72.0 |
| F—stripped | 80.8 |

When high-solids latex is produced in the manner herein described, the particle size distribution is different from that in conventional high-solids latex. There is a broad range in the size of the particles with relatively large numbers of particles being above and below average size when a polymer initiation zone is used.

Each of the samples of latex was examined under an optical microscope for large particles. Samples A and B were shown to have a few large particles ranging as large as 7 microns. Samples C and D had many large particles but most of them were about 1 to 2 microns with a few being as large as 7 microns. Most of the large particles in E and F were about 1 to 2 microns with a few being as large as 5 microns.

The effect of the polymer initiation zone is best shown by referring to the attached graphs. The percent particles per millimicron, based on total polymer particles, is plotted against the particle size in millimicrons ($m\mu$). The area under the curves is 100 percent.

Figure 2 is a graph showing the particle distribution of the latex produced during phase A of the run. It is seen that the bulk of the particles lie in the size range between 100 and 130 millimicrons.

Figure 3 is a graph showing the particle distribution of the latex produced during the second phase, phase B, of the run. There are two peaks A and B. Peak A results from that portion of phase B during which the polymer initiation zone was used. The peak at B corresponds to the peak shown in Figure 2.

Figures 4, 5, 6 and 7 are graphs showing the distribution of particle sizes of the latex produced during the next 4 phases of the run. These graphs show the effects of the various operating conditions. However, it should be noted that in all of these curves on latex made with the polymer initiation zone, that the spread is wider than it was in Figure 2 and the peak is located in the lower millimicron size.

These curves clearly show that the latex produced with the use of the polymer initiation zone has an entirely different particle size distribution and thereby a different physical character than does the latex produced without the polymer initiation zone. For example, over seventy-five percent of our particles have a diameter of less than 100 millimicrons and essentially no unit particle size contains more than 2½ percent of the total. On the other hand, over seventy-five percent of the normal latex has a particle size over 100 millimicrons and in the instant case lies between 100 and 130 millimicrons. Also the unit particle sizes between 110 and 120 each contain over 3.5 percent of the total particles. It can also be seen that over seventy-five percent of my latex has a particle size distribution spread over a wider range than does the normal produced latex. Over seventy-five percent of my particles have a particle diameter range between 25 and 100 millimicrons while over seventy-five percent of the particles of the normal latex have particles diameter range between 100 and 130 millimicrons.

This process is particularly applicable for the production of synthetic rubber latices to be used as such. Latices obtained are useful for the production of foam sponge, for the manufacture of latex base paints, and for various latex dipping operations. If the latex obtained from the reactor does not have as high a solids content as desired, it can be concentrated by any suitable means.

As will be evident to those skilled in the art, various modifications of this invention can be made, or followed, in the light of the foregoing disclosure and discussion, without departing from the spirit or scope of the invention.

We claim:

1. A continuous emulsion polymerization process for the production of high-solids latex which comprises continuously introducing a polymerizable monomeric material selected from the group consisting of conjugated dienes, haloprenes, aryl olefins, vinyl naphthalenes, acrylic and methacrylic acids, acrylic and methacrylic nitriles, acrylic and methacrylic amides, acrylates, vinyl ketones, vinyl ethers, vinyl carbinols, vinyl acetates, vinyl furanes, vinyl carbazoles and vinyl acetylenes and mixtures of same and a micelle forming emulsifying agent under micelle forming conditions into a polymer initiation zone under polymerizing conditions for a residence time sufficient to effect a low degree of polymerization, not over 12 percent of the monomers supplied to said zone, whereby polymer particles are formed within the formed micelles, continuously withdrawing total stream containing said polymer particles in micelle form from said polymer initiation zone, and continuously introducing the said stream into a reactor under polymerization conditions for a residence time sufficient to effect the desired degree of polymerization.

2. A continuous emulsion polymerization process for the production of high-solids latex which comprises continuously introducing a portion of an aqueous emulsion stream comprising a polymerizable monomer selected from the group consisting of conjugated dienes, haloprenes, aryl olefins, vinyl naphthalenes, acrylic and methacrylic acids, acrylic and methacrylic nitriles, acrylic and methacrylic amides, acrylates, vinyl ketones, vinyl ethers, vinyl carbinols, vinyl acetates, vinyl furanes, vinyl carbazoles and vinyl acetylenes and mixtures of same and a micelle forming emulsifying agent under micelle forming conditions into a polymer initiation zone under polymerizing conditions for a sufficient residence time to effect a low degree of polymerization, not over 12 percent of the monomer supplied to said zone, in micelle form whereby polymer particles are formed within the micelles, continuous withdrawing said polymer particles from said zone and continuously introducing the withdrawn polymer particles along with the additional aqueous emulsion of the type described into a reactor under polymerization conditions for a residence time sufficient to effect the desired degree of polymerization.

3. A continuous emulsion polymerization process for the production of high-solids latex which comprises continuously introducing a polymerizable monomeric material selected from the group consisting of conjugated dienes, haloprenes, aryl olefins, vinyl naphthalenes, acrylic and methacrylic acids, acrylic and methacrylic nitriles, acrylic and methacrylic amides, acrylates, vinyl ketones, vinyl ethers, vinyl carbinols, vinyl acetates, vinyl furanes, vinyl carbazoles and vinyl acetylenes and mixtures of same and a micelle forming emulsifying agent under micelle forming conditions into a polymer initiation zone under polymerizing conditions for a residence time sufficient to effect a degree of polymerization within the range 1 to 12 percent of the monomers supplied to said zone whereby polymer particles are formed within the micelles, continuously withdrawing of said polymer particles from said polymer initiation zone and continuously introducing the said particles into a reaction zone under polymerization conditions for a residence time sufficient to effect the desired degree of polymerization and wherein the polymer concentration in the latex in the said reaction zone remains substantially uniform.

4. The process of claim 3 wherein the degree of polymerization in the micelle forming zone is in the range 3 to 10 percent of the monomer supplied to that zone.

5. The process of claim 4 wherein the said micelle forming emulsifying agent is selected from the group consisting of ammonium and alkali metal salts of a fatty acid.

6. The process of claim 4 wherein the micelle forming emulsifying agent consists of an alkali metal salt of a fatty acid in admixture with a salt of a rosin acid, said rosin acid salt being selected from the group consisting of sodium and potassium salts of a rosin acid.

7. The process of claim 6 wherein the latex forming stream comprises a major amount of a conjugated diene of 4 to 6 carbon atoms inclusive.

8. The process of claim 6 wherein the latex forming stream comprises a major amount of 1,3-butadiene and a minor amount of styrene.

9. A continuous emulsion polymerization process for the production of high-solids latex which comprises continuously introducing a portion of a latex forming stream comprising a polymerizable monomer selected from the group consisting of conjugated dienes, haloprenes, aryl olefins, vinyl naphthalenes, acrylic and methacrylic acids, nitriles, amides, acrylates, vinyl ketones, vinyl ethers, vinyl carbinols, vinyl acetates, vinyl furanes, vinyl carbazoles and vinyl acetylenes and mixtures of same and a micelle forming emulsifying agent under micelle forming conditions into a polymer initiation zone under polymerization conditions at room temperature for a sufficient residence time to effect a degree of polymerization within the range of 3 to 10 percent of the monomers supplied to said zone whereby small polymer particles are formed, continuously withdrawing said polymer particles from said polymer initiation zone and continuously introducing the said polymer particles along with the remainder of said recipe stream into a reaction zone under polymerization at a temperature not greater than 50° F. for a residence time sufficient to effect the desired degree of polymerization and wherein the polymer concentration in the latex in the said reaction zone remains substantially uniform.

10. The process of claim 9 wherein the micelle forming emulsifying agent is selected from the group consisting of sodium and potassium salts of a fatty acid and is in admixture with a rosin acid salt selected from the group consisting of sodium and potassium salts of rosin acid.

11. The process of claim 10 wherein the monomeric material comprises a major amount of a conjugated diene of 4 to 6 carbon atoms inclusive.

12. The process of claim 10 wherein the monomeric material consists of a major amount of 1,3-butadiene and a minor amount of styrene.

13. A latex resulting from polymerizing in an aqueous soap emulsion a monomer selected from the group consisting of conjugated dienes, haloprenes, aryl olefins, vinyl naphthalenes, acrylic and methacrylic acids, acrylic and methacrylic nitriles, acrylic and methacrylic amides, acrylates, vinyl ketones, vinyl ethers, vinyl carbinols, vinyl acetates, vinyl furanes, vinyl carbazoles and vinyl acetylenes and mixtures of same wherein the percent of polymer particles of any millimicron particle size does not exceed 2½ percent of the total polymer.

14. A latex resulting from the polymerization of a monomer selected from the group consisting of conjugated dienes, haloprenes, aryl olefins, vinyl naphthalenes, acrylic and methacrylic acids, acrylic and methacrylic nitriles, acrylic and methacrylic amides, acrylates, vinyl ketones, cinyl ethers, vinyl carbinols, vinyl acetates, vinyl furanes, vinyl carbazoles, and vinyl acetylenes and mixtures of same in an aqueous soap emulsion wherein over 75 percent of the particles are of a particle size within the range of 25 to 100 millimicrons and wherein the percent of particles of any millimicron particle size does not exceed 2½ percent of the total polymer.

15. The latex of claim 14 wherein the monomer consists of a major amount of a conjugated diene of 4 to 6 carbon atoms and a minor amount of an aryl olefin.

16. The latex of claim 5 wherein the monomers are 1,3-butadiene and styrene.

References Cited in the file of this patent

UNITED STATES PATENTS

| | | |
|---|---|---|
| 2,444,689 | Willson | July 6, 1948 |
| 2,475,016 | De Nie | July 5, 1949 |
| 2,520,959 | Powers | Sept. 5, 1950 |
| 2,587,562 | Wilson | Feb. 26, 1952 |

OTHER REFERENCES

Whitby: Synthetic Rubber, Wiley & Sons, N. Y., pps. 249–251.